United States Patent [19]

Silver et al.

[11] 4,178,046

[45] Dec. 11, 1979

[54] FOIL BEARING

[75] Inventors: Alexander Silver, Tarzana; James R. Wenban, Redondo Beach, both of Calif.

[73] Assignee: The Garrett Corporation, Los Angeles, Calif.

[21] Appl. No.: 689,619

[22] Filed: May 24, 1976

[51] Int. Cl.² .............................................. F16C 17/00
[52] U.S. Cl. ...................................... 308/9; 308/5 R; 308/121; 308/160; 308/163; 308/DIG. 1

[58] Field of Search ................... 308/9, 5 R, 121, 160, 308/163, 172, DIG. 1

[56] References Cited

U.S. PATENT DOCUMENTS 3,893,733  7/1975  Silver et al. .............................. 308/9

Primary Examiner—Richard A. Bertsch
Attorney, Agent, or Firm—Joel D. Talcott; Albert J. Miller

[57] ABSTRACT

Disclosed is a foil bearing in which the individual compliant foils are mounted intermediate the ends thereof.

60 Claims, 17 Drawing Figures

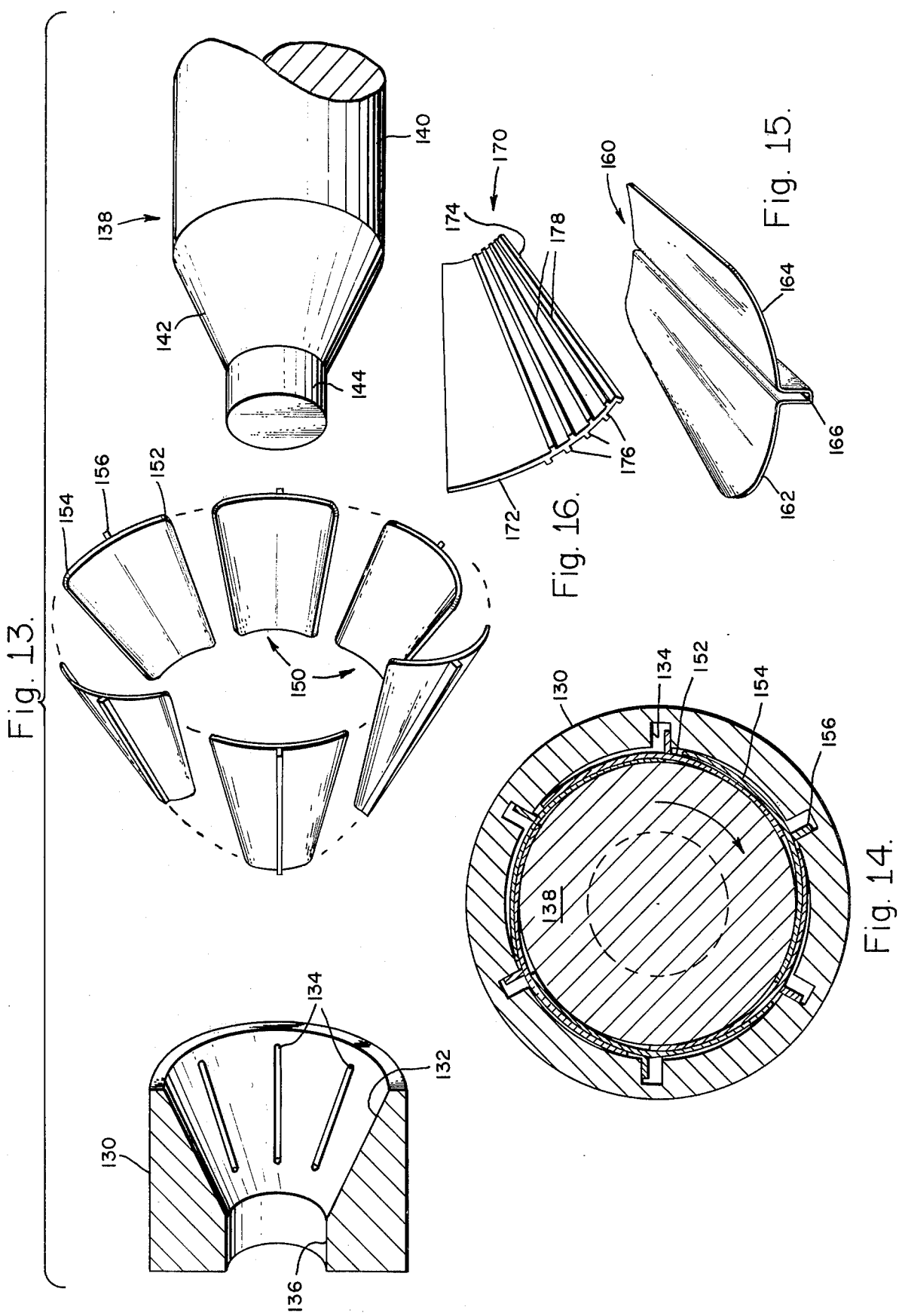

FOIL BEARING

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions forms a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, may be deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capacity. While these externally pressurized or hydrostatic fluid bearings do increase the load carrying capacity they do introduce the requirement for an external source of clean fluid under pressure.

Illustrative of hydrodynamic and/or hydrostatic bearing patents assigned to the same Assignee of this application are U.S. Pat. Nos.: 3,215,479, 3,215,480, 3,366,427, 3,375,046, 3,382,014, 3,434,761, 3,434,762, 3,467,451, 3,511,544, 3,560,064, 3,615,121, 3,635,534, 3,642,331, 3,677,612 and 3,893,733.

It is common practice when mounting the individual foils to one of the relatively movable elements to affix one end of the foil to the element in some fashion. The most common practice, as exemplified in U.S. Pat. Nos. 3,366,427, 3,375,046 and 3,615,121, is to attach a rod or bar to the end of the foil which can then be retained in a slot or groove in one of the relatively movable elements. Alternately, as exemplified in U.S. Pat. No. 3,382,014, a plurality of overlapping foils may be individually mounted on a foil base such as by spot welds. The base would then be frictionally held against one of the relatively movable elements. Further a lip or projection at one end of the foil may be restrained in a slot or groove in one of the relatively movable elements. Examples of this type of mounting can be found in U.S. Pat. Nos. 3,511,544, 3,747,997 and 3,809,443.

While anchoring the bearing foil or foils at one end continues to be satisfactory for many foil bearing applications, this type of mounting does present certain inherent limitations and disadvantages. For example, mounting the foil at one end, particularly a longer foil, introduces a tendency for the foil to tighten up during start-up while the two relatively movable members are rubbing. To overcome this wrap or tightening, higher torque is required before lift off (i.e., establishment of the fluid film between adjacent surfaces) occurs. This tendency is much more marked in conical bearings since the foils are forced into a converging sway space under axial load, the so-called "Chinese finger effect." Also there are situations in which the foil lips or anchors can be pulled out of their slots or grooves so as to bind movement between the two relatively movable members. When thin foils are used to improve the surface compliance, flutter and instability can be introduced. On the other hand, when higher stiffness is employed in lieu of damping to reduce resilient frequency amplitudes, higher starting torques are required for end mounted foils. There is no convenient place to apply effective damping except the beam load supports at the ends of these foils where they are mounted.

SUMMARY OF THE INVENTION

The invention described herein provides for the mounting of individual foils intermediate the ends thereof. The mounting of the foil generally near the center thereof substantially eliminates most of the inherent problems for an end mounted foil bearing. The centrally mounted foil greatly reduces starting torque while providing substantially higher load capacity with fewer foils. A stiffer bearing can be provided with thinner more compliant and formable foils which provides better centering between relatively rotatable elements. In addition, load capacity can be increased by providing a separate stiffener foil under each of the individual centrally mounted foils, while damping can be controlled in a number of ways.

DESCRIPTION OF THE DRAWINGS

FIG. 13 is an exploded view of a conical foil bearing of the present invention;

FIG. 14 is a sectional view of the assembled conical foil bearing shown in exploded fashion in FIG. 13;

FIG. 15 is a perspective view of an alternate conical bearing foil element of the present invention; and FIG. 16 is a perspective view of another alternate conical bearing foil element of the present invention.

DESCRIPTION OF THE PREFERRED EMBODIMENTS

Figure 1:
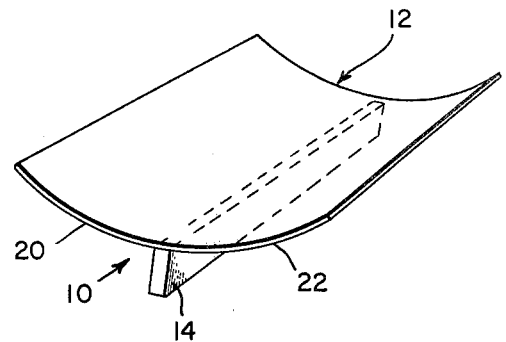
FIG. 1 is a perspective view of an individual foil bearing element of the present invention.
Figure 2:
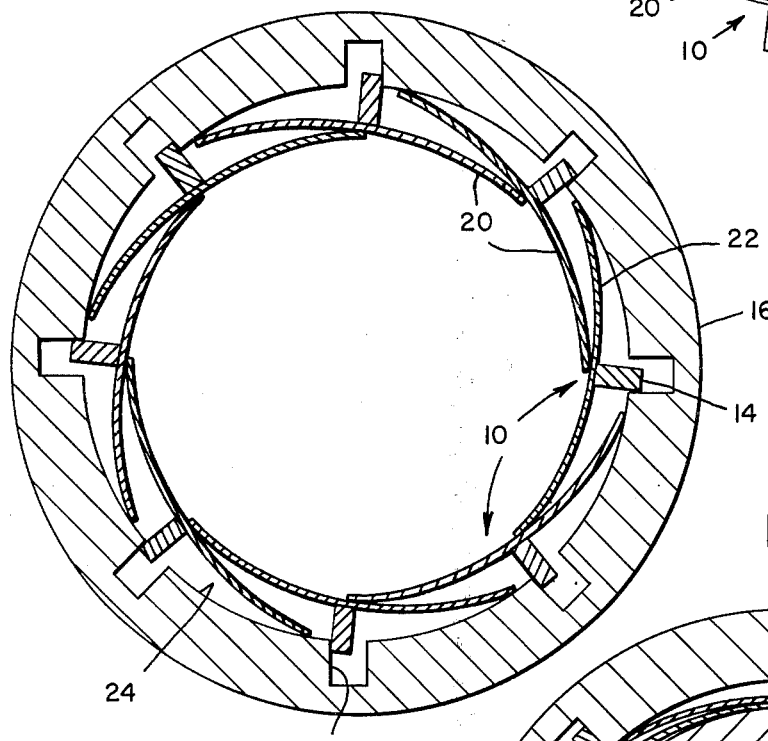
FIG. 2 is an end view of a plurality of foil bearing elements of FIG. 1 mounted in a bushing.

As illustrated in FIG. 1 the foil bearing elements 10 of the present invention comprises a thin compliant bearing foil 12 having a mounting bar or rod 14 affixed intermediate the ends thereof, for example by spot welding. While generally shown as symmetrical the compliant foil can be of any particular shape to meet the application required. Also, the mounting bar 14 need not be affixed at the center of the foil even if the foil is symmetrical. A plurality of foil bearing elements 10 are adapted to be placed around the interior of a bushing 16 such as illustrated in FIG. 2. The mounting bars 14 are adapted to fit in grooves or slots 18 in the inner surface of the bushing 16. As illustrated in FIG. 2 the bearing foil 12 includes an over foil 20 and an under foil 22 on either side of the mounting bar 14. The under foil 22 on one side of the mounting bar 14 is adapted to be positioned under the over foil 20, on the other side of the mounting bar 14, of the next adjacent bearing foil 12. The free end of the under foil 22 will generally be in contact with the inner surface 24 of the bushing 16 near the next adjacent slot 18 while free end of the upper foil 20 will contact the next adjacent bearing foil in the general vicinity of the mounting bar 14.

Figure 3:
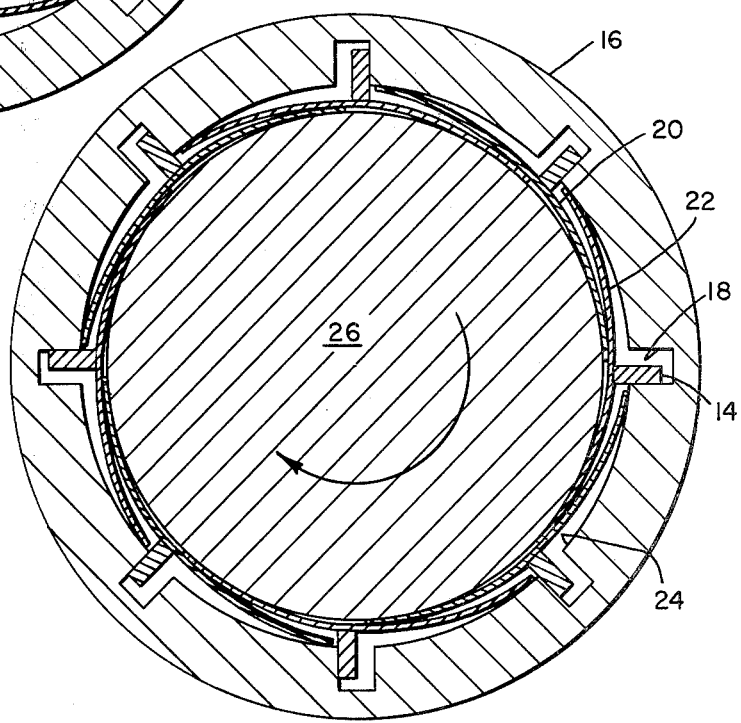
FIG. 3 is an end view of the FIG. 2 bushing and foil bearing elements with a shaft inserted therein.

As illustrated in FIG. 3, when a shaft 26 is inserted into the bushing 16, the compliant bearing foils 12 are compressed into the space between the shaft 26 and bushing 16 such that the under foil 20 provides a resilient support for the over foil 20 of the next adjacent bearing foil 12. The mounting bars 14 are also forced more deeply in the grooves 18 at the inner surface of the bushing 16. Each foil 12 acts as a flexible beam pivoting on and supported at the end of the under foil 22 by the inner surface 24 of bushing 16 and at the free end of the over foil 20 by the next adjacent bearing foil 12. Under load, the individual bearing foils 12 tend to bend between the support points. The end of the under foil 22 will tend to slide on the inner surface 24 of the bushing 16 while the free end of the over foil 22 will slide over the next adjacent bearing foil 12. Movement of the bearing foils 12 will, however, be limited by the mounting bar 14 in the slot 18.

While FIGS. 1-3 generally illustrate the basic journal bearing design for the improved foil bearing of the present invention, a great many adaptations and variations are possible as will be brought out in the following discussion.

Figure 2A:
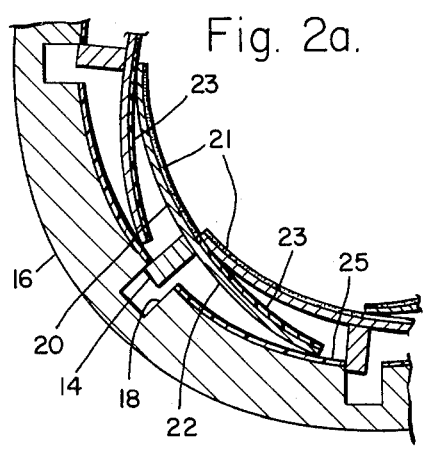
FIG. 2a is a partial end view of a plurality of coated foil bearing elements mounted in a bushing.
Figure 11:
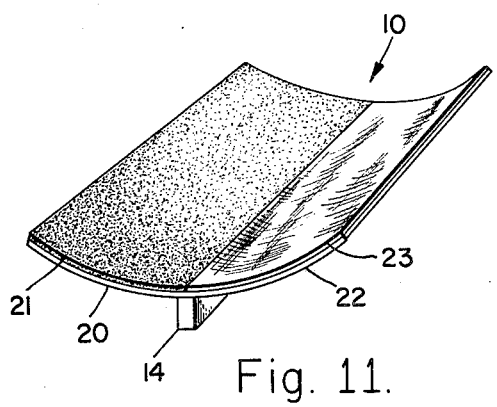
FIG. 11 is a perspective view of still yet another alternate embodiment of a foil bearing element of the present invention.

In order to provide lubricity and wear resistance where required and to control the damping characteristics of the foil bearing elements, various coatings can be utilized on particular surfaces of the foil bearing. As illustrated in FIGS. 2a and 11, the upper surface of the over foil 20 which is in contact with the shaft 26 before lift off, can be coated with a high temperature, high lubricity, wear resistant coating 21 such as a stratified fluorocarbon. The upper surface of the under foil 22, upon which the under surface of the over foil 20 slides can be coated with a coating 23 having less lubricity than the over foil coating 21 since there is no contact with the shaft 26. A mixture of high temperature superpolymers, such as polyphenylene sulfide filled with a wear resistant material, for example, an oxide of cobalt, can be used. An undercoat of a stratified fluorocarbon has been found to improve the adhesion of such a coating. Since the under surface of the under foil 22 slides on the inner surface 24 of the bushing 16, the inner surface 24 may be coated with a coating 25 of a material similar to the coating 23 on the upper surface of the under foil 22.

The relative sliding movement between the under surface of the over foil 20 and the coating 23 on the upper surface of the under foil 22 and between the under surface of the under foil 22 and the coating 25 on the inner surface 24 of the bushing 16 together with the squeeze film formed between adjacent overlapping foils greatly influences the damping action of the foil bearing. By properly selecting materials for the coatings 23 and 25, this damping action can be controlled. Proper bearing performance requires that damping be maintained within prescribed limits since over damping will reduce the load capacity and increase starting torque while under damping will increase the amplitude of shaft runout under external vibration.

Figure 4:
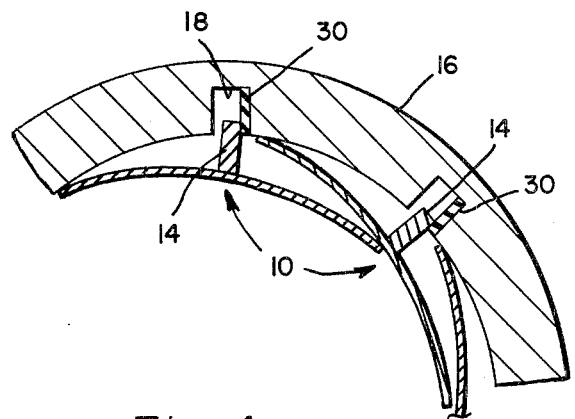
FIG. 4 is a partial end view of the foil bearing elements of FIG. 1 inserted into an alternate bushing.
Figure 5:
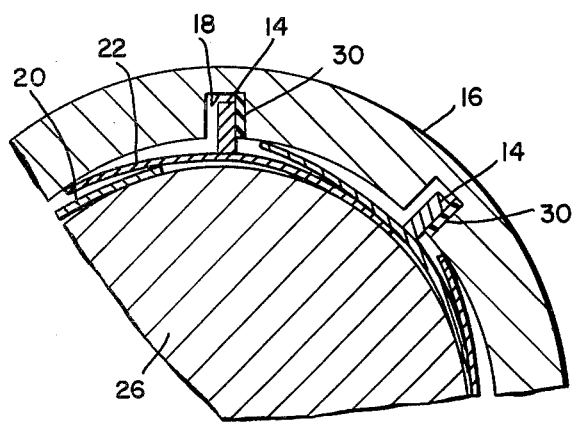
FIG. 5 is a partial end view of the bushing and foil bearing elements of FIG. 4 with a shaft inserted therein.

As generally illustrated in FIGS. 4 and 5, bearing damping can also be affected by the frictional contact between the mounting bar 14 and the groove 18 in bushing 16. The addition of a coating 30 of a friction material on the side surface of the groove 18 in contact with the mounting bar 14 to produce a non-galling friction contact will increase the damping of the foil bearing.

Figure 6:
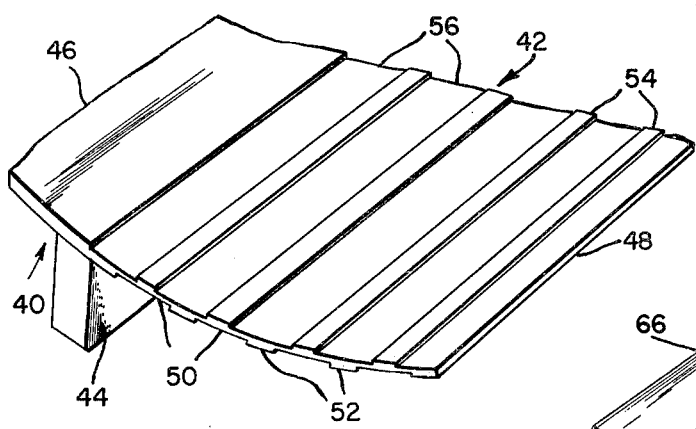
FIG. 6 is a perspective view of an alternate foil bearing element of the present invention.

Besides the application of coatings to the rubbing surfaces of the foil bearing, the bearing foils can be altered in configuration to provide particular advantages. For example, as illustrated in FIG. 6, the foil bearing element 40, including bearing foil 42 affixed to mounting bar 44, can have the under surface of the under foil 48 etched or grooved to alternately provide flat topped ridges 50 and grooves 52. The top surface is also provided with alternate ridges 54 and grooves 56, the ridges 54 on the upper surface being spaced between the ridges 50 on the lower surface. The grooves 52 and 56 provide useful cooling to the bearings by directing the flow of fluid along the length of the foil. The ridges 50 and 54 are generally flat topped so as to facilitate sliding of the foils thereover and also to minimize waviness in the fluid film surface. The total thickness of the under foil 48 as measured from the bottom of a ridge 50 to the top of a ridge 54 is preferably equal to the thickness of the over foil 46.

Figure 7:
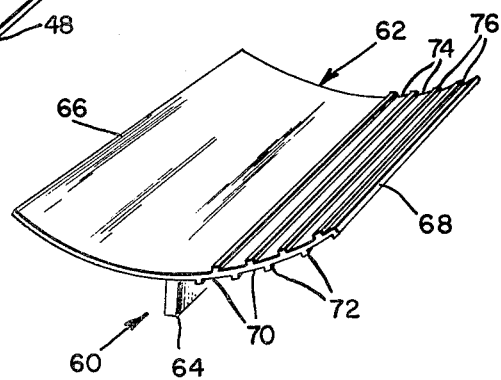
FIG. 7 is a perspective view of yet another alternate embodiment of a foil bearing element of the present invention.

In the FIG. 7 embodiment, both the upper and lower surfaces of the under foil 68 may also be etched or grooved. On the under surface grooves 70 and ridges 72 are alternately produced while grooves 74 and ridges 76 alternate on the upper surface. In this embodiment, the thickness of the over foil 66 is equal to the thickness of the under foil 68 as measured from a groove 70 to a groove 74.

In order to provide a resilient or spring-like under foil, the upper surface ridges of each of the embodiments of FIGS. 6 and 7 are opposed to the lower surface grooves while the upper surface grooves are opposed to the lower surface ridges. While the grooves and ridges of FIGS. 6 and 7 can be accurately and cheaply produced by photo chemical etching or matching techniques, alternative methods, such as bonding a plurality of narrow strips to the foil surfaces, could be utilized.

Structure and stiffening function of this lower foil is described in detail in our application Ser. No. 689,620, filed concurrently herewith.

With a resilient or spring-like under foil of FIG. 7, the under foil 68 will tend to bend more locally in a radial direction between the ridges while the free end of the under foil 68 tends to slide considerably less. The under side of an over foil will contact only the projecting ridges of the upper surface of the under foil.

Figure 9A:
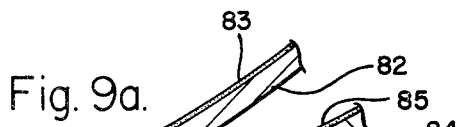
FIG. 9a is an enlarged section of a portion of FIG. 8 having coated elements.
Figure 8:
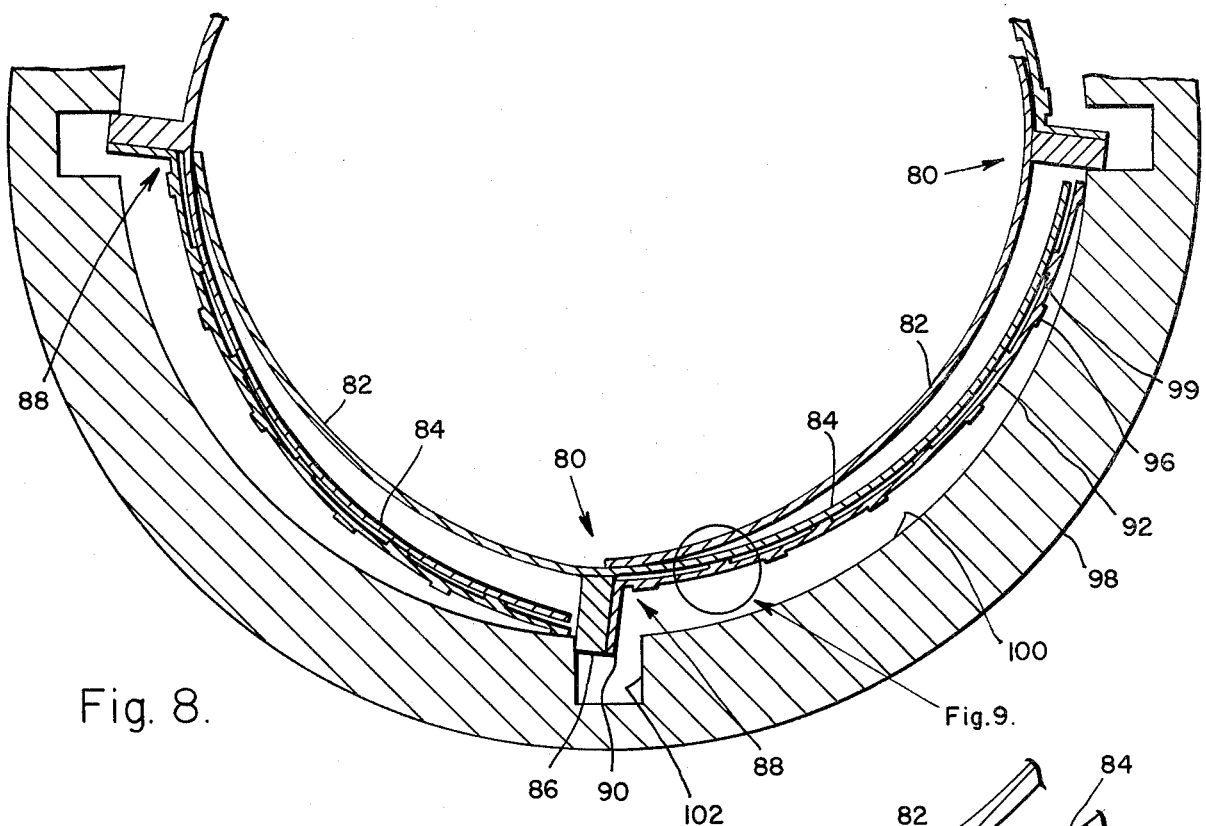
FIG. 8 is an enlarged partial end view of an alternate foil bearing of the present invention having a separate bearing stiffener.
Figure 9:
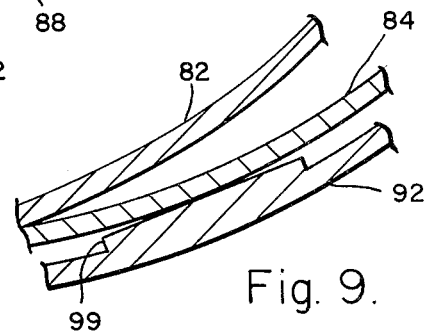
FIG. 9 is an enlarged section of a portion of FIG. 8.

Another alternative foil bearing configuration is illustrated in FIGS. 8, 9 and 9a. In this configuration a separate stiffener 88 is provided under the under foil 84. The foil bearing element 80 can be comparatively lighter and more compliant and can have a longer over foil 82 and longer under foil 84 extending on either side of the mounting bar 86. A lighter, more flexible longer foil (fewer number of foils) is advantageous as regards the ideal fluid film shape. Whereas a total of 8 foil elements are illustrated in FIGS. 2 and 3, a total of 4 foils are illustrated in FIG. 8 for purposes of comparison.

The stiffener 88 includes a stiffener foil 92 positioned immediately below the under foil 84 and a stiffener mounting 90 positioned adjacent the mounting bar 86. Both the mounting bar 86 and the stiffener mounting 90 are adapted to be inserted into grooves 102 in the inner surface 100 of the bushing 98. The stiffener foil 92 which has generally the same curvature as the under foil 84 has a plurality of spaced ridges on both the upper and lower surfaces thereof. The upper surface ridges 99 alternate with the lower surface ridges 96 to produce a compliant, spring-like stiffener foil 92. The upper surface ridges 99 each have a flat top which is in contact with the under side of the under foil 84. This is clearly illustrated in FIG. 9. The lower surface ridges 96 may also be flat.

Since the stiffener foil 92 is not in direct contact with the surface of the under foil 84 that "sees" the fluid film formed between the shaft and the outer foil 82, the mechanical-elastic foundation tends to be separated from the aerodynamic consideration. In conventional end mounted foils, it is necessary to have shorter and/or thicker foils to increase the spring load capacity to support a higher film pressure. The shorter, thicker foils, however, detracted from the ideal fluid film shape and were less compliant to local misalignments. The embodiment of FIGS. 8 and 9 enables the bearing to have a higher load capacity with a lower starting torque with fewer, but stiffer foils. In addition, better centering and cooling are achieved. The control of damping with respect to foil dynamic response has also been achieved.

The stiffener foil 92, which can be photo-chemically etched in the same manner as the under foil 68 of FIG. 7, can be coated with a wear resistant material filled super polymer mixture such as cobalt oxide filled polyphenylene sulfide as illustrated in FIG. 9a. The coating 97 may only be required on the flat surfaces of the upper surface ridges 99 which contact the under side of the under foil 84 although it may be easier to coat the entire upper surface. Coatings 83 and 85 of a stratified fluorocarbon such as Teflon-S may be applied to the upper surfaces of the under foil 84 and over foil 82 respectively. The inner surface 100 of the bushing 98 may also be coated with a wear-resistant material filled super polymer mixture.

Figure 10:
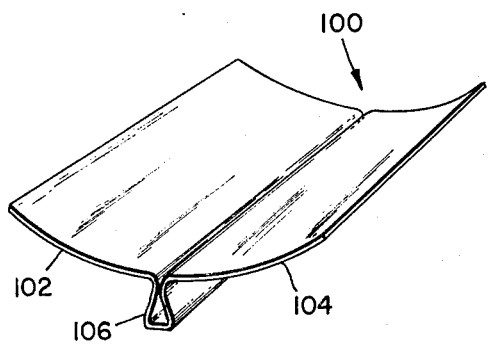
FIG. 10 is a perspective view of still another alternate embodiment of a foil bearing element of the present invention.

While to this point, the foil bearing elements have been described as comprising a separate foil and mounting bar joined together, it is possible to form the foil bearing elements as an integral unit as illustrated in FIG. 10. The integral foil bearing element 100 comprises a generally U-shaped channel 106 having an over foil 102 extending in one direction and an under foil 104 extending in the other. The integral foil element 100 of a thin compliant material can be easily bent into the desired configuration.

Figure 12:
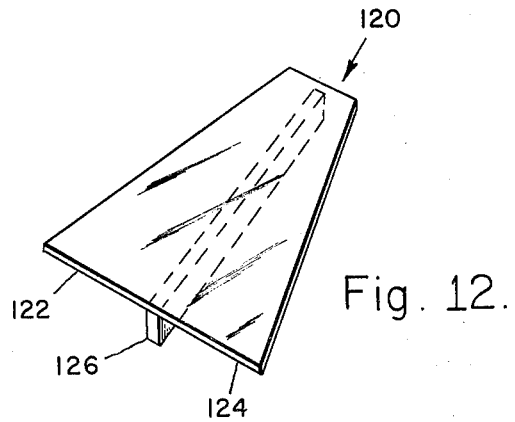
FIG. 12 is a perspective view of a thrust bearing foil element.

Also all of the previous configurations have been directed to use of foil bearings in a journal bearing application, it should be recognized that the foil bearing elements of the present invention are also applicable to other types of other bearing arrangements, for example thrust bearings and conical bearings. A foil bearing element 120 for a thrust bearing is generally illustrated in FIG. 12. For a thrust bearing application, the bearing foil comprising over foil 122 and under foil 124 are generally flat and mounted on a mounting bar 126. In some applications, the individual bearing foils need not necessarily overlap. Also, a plurality of individual thrust bearing foils can be mounted on a thrust plant as generally illustrated in U.S. Pat. No. 3,615,121.

A conical foil bearing application of the present invention is generally illustrated in FIGS. 13–16. The foil bearing elements 150 comprise an over foil 152 and under foil 154 extending on either side of the mounting bar 156. The bar 156 is adapted to fit into grooves 134 in the conical bore 132 in the bearing bushing 130. A cylindrical bore 136 extends from the conical bore 132 through the remainder of the bushing 130. The shaft 138 having cylindrical section 140, conical section 142, and cylindrical section 144 is adapted to be inserted into the bushing 130 having a plurality of bearing elements 150, mounted therein. The conical bearing is shown in exploded perspective in FIG. 13 and in assembled section in FIG. 14.

As was the case with respect to the journal type bearings, many variations are possible in the basic arrangement of thrust and conical type bearings. For example corresponding surfaces of the thrust and conical type bearing can be coated as illustrated in FIGS. 2a and 11 and a separate stiffener foil can be utilized as shown in FIGS. 8 and 9. Specifically illustrated in FIG. 15 is an integral conical foil 160 generally corresponding to the integral journal foil of FIG. 10. Over foil 162 and under foil 164 extend on either side of the generally U-shaped mounting channel 166. In addition, a conical bearing foil 170 having a spring-like under foil 174 is illustrated in FIG. 16. Upper surface ridges 178 alternate with lower surface ridges 176 along the under foil 174. With both the over foil and under foil 174 tapered for the conical application the ridges 176 and 178 likewise taper, that is, the spacing between the ridges decreases from one end to the other end of the foil.

Also, while the illustrations provided illustrate the bearing mounted on the bushing, the same mounting arrangements can be utilized to mount the bearings on the shaft. The number, shape, and configuration of the individual bearing foils can be varied considerably to meet numerous specific applications so long as the mounting thereof is not on either end thereof but somewhere intermediate the ends thereof.

While specific embodiments of the invention have been illustrated and described, it is to be understood that these are provided by way of example only and that the invention is not to be construed as being limited thereto but only by the proper scope of the following claims.

We claim:

1. In combination:

a pair of members arranged for relative movement with respect to one another; and a compliant foil bearing operably disposed between said pair of relatively rotatable members, said compliant foil bearing comprising a plurality of overlapping compliant foils and means intermediate the ends of each foil for mounting said foils on one of said pair of members.

2. The combination of claim 1 wherein said mounting means is positioned centrally on each foil.

3. The combination of claim 1 wherein each of said mounting means comprises a mounting bar attached to one of said foils.

4. The combination of claim 1 wherein said mounting means is integrally formed on each foil.

5. The combination of claim 4 wherein said mounting means comprises a generally U-shaped channel.

6. The combination of claim 1 including foil stiffening means mounted on said one of said pair of members and extending in one direction from said mounting means for increasing the effective stiffness of said foils.

7. The combination of claim 6 wherein said foil stiffening means is integral with each of said compliant foils.

8. The combination of claim 1 wherein said foil bearing comprises a journal bearing.

9. The combination of claim 1 wherein said bearing comprises a conical bearing.

10. The combination of claim 1 wherein said foil bearing comprises a thrust bearing.

11. In combination:
a pair of members arranged for relative rotation with respect to one another, one of said pair of members being adapted to rotatively support the other; and a plurality of compliant, overlapping bearing foils operably disposed between said pair of relatively rotatable members, each of said plurality of foils having a first free end adjacent one of said pair of relatively rotatable members, a second free end extending between said pair of members and overlapping the first free end of an adjacent foil, and means intermediate said first and second ends for mounting each of said foils on said one of said pair of relatively rotatable members.

12. The combination of claim 11 wherein said mounting means is positioned on each foil centrally between said first and second ends.

13. The combination of claim 11 wherein each of said mounting means comprises a mounting bar attached to said foil.

14. The combination of claim 11 wherein said mounting means is integrally formed on each foil.

15. The combination of claim 14 wherein said mounting means comprises a generally U-shaped channel.

16. The combination of claim 11 including foil stiffening means mounted on said one of said pair of members and extending in one direction from said mounting means for increasing the effective stiffness of said foils.

17. The combination of claim 16 wherein said foil stiffening means is integral with each of said compliant foils.

18. The combination of claim 11 wherein each of said bearing foils is arcuate.

19. The combination of claim 11 wherein each of said bearing foils is generally trapezoidal.

20. The combination of claim 11 including a plurality of slots in said one of said pair of members, each of said slots being adapted to receive the mounting means of one of said plurality of bearing foils.

21. The combination of claim 11 including a plurality of slots in said one of said pair of members, each of said slots being adapted to receive the mounting means of one of said plurality of bearing foils, and means in each of said slots for controlling the frictional engagement of said mounting means in said slot.

22. The combination of claim 11 wherein each of said bearing foils has an over foil portion having a free end and an under foil portion extending from said mounting means and the free end of each over foil portion contacts an adjacent under foil portion.

23. The combination of claim 22 wherein said under foil portion comprises a foil stiffening element.

24. The combination of claim 22 including coating means on an upper surface of said over foil portion.

25. The combination of claim 24 including coating means on an inner surface of said one of said pair of members.

26. The combination of claim 25 wherein said coating means is a stratified fluorocarbon.

27. The combination of claim 11 wherein each of said bearing foils has an over foil portion having a free end and an under foil portion extending from said mounting means, the free end of each over foil portion contacting an adjacent under foil portion, and including coating means on an upper surface of said over foil portion and on an inner surface of said one of said pair of members and wherein said coating means is a high lubricity material.

28. The combination of claim 11 wherein each of said bearing foils has an over foil portion having a free end and an under foil portion extending from said mounting means, the free end of each over foil portion contacting an adjacent under foil portion, and said under foil portion comprises a foil stiffening element having a first operative configuration for providing damping by bending and a second operative configuration for providing damping by compression.

29. The combination of claim 11 wherein each of said bearing foils has an over foil portion having a free end and an under foil portion extending from said mounting means, the free end of each over foil portion contacting an adjacent under foil portion, and wherein said under foil portion has alternating ridge and groove means along its inner surface and outer surface, each outer surface ridge means positionally corresponding to an inner surface groove means.

30. In combination:
a bearing support member having an opening to receive a rotatable shaft;

a rotatable shaft operably disposed within the opening of said bearing support member; and a compliant foil bearing operably disposed between the rotatable shaft and the bearing support member, said compliant foil bearing comprising a plurality of compliant, overlapping foils having a generally U-shaped channel integrally formed on each foil intermediate the ends thereof for mounting within the rotatable shaft receiving opening in the bearing support member.

31. A method of supporting relative movement between two members, one of which being supportive of the other, comprising the steps of:
providing a plurality of compliant, overlapping foils between the two members;

positioning each of said compliant foils with a first free end of each of said plurality of foils extending between said two members and overlapping a second free end of an adjacent one of said plurality of foils; and mounting each of said compliant foils on one of said members at a position intermediate the ends of each foil.

32. The method of claim 31 wherein the step of mounting each of said compliant foils comprises the steps of:

positioning a mounting bar intermediate the ends of each foil;

attaching each mounting bar to its respective foil and mounting each mounting bar on one of said members.

33. The method of claim 32 wherein the step of positioning a mounting bar comprises positioning said mounting bar centrally on each foil.

34. The method of claim 31 wherein the step of mounting each of said compliant foils comprises the steps of:

forming a generally U-shaped channel intermediate the ends of each foil; and mounting each channel on one of said members.

35. The method of claim 34 wherein the step of forming a generally U-shaped channel comprises mounting said channel centrally on each foil.

36. The method of claim 31 including the additional step of mounting foil stiffening means on said one of said members for increasing the effective stiffness of said foils.

37. A compliant foil for use in a foil bearing system, said foil comprising a compliant member including mounting means intermediate the ends thereof.

38. A compliant foil as in claim 37 wherein said mounting means is positioned centrally on said foil.

39. A compliant foil as in claim 37 wherein said mounting means comprises a mounting bar attached to said compliant member.

40. A compliant foil as in claim 37 wherein said mounting means comprises a generally U-shaped channel formed in said compliant member.

41. A compliant foil as in claim 37 including foil stiffening means formed integrally with said member and extending from said mounting means in one direction.

42. A compliant foil as in claim 37 shaped generally to form a portion of a cylinder.

43. A compliant foil as in claim 37 shaped generally to form a portion of a cone.

44. A compliant foil as in claim 37 having a generally trapezoidal shape.

45. A compliant foil as in claim 37 wherein an over foil portion extends from said mounting means in one direction and an under foil portion extends from said mounting means in another direction.

46. A compliant foil as in claim 37 wherein an over foil portion extends from said mounting means in one direction and an under foil portion extends from said mounting means in another direction, said under foil portion comprising a foil stiffening element.

47. A compliant foil as in claim 46 wherein said foil stiffening element has a first operative configuration for providing damping by bending and a second operative configuration for providing damping by compression.

48. A compliant foil as in claim 45 wherein said under foil portion has alternating ridge and groove means along its inner surface and outer surface, each outer surface ridge means positionally corresponding to an inner surface groove means.

49. A compliant foil as in claim 45 including coating means on an upper surface of said over foil portion.

50. A compliant foil as in claim 49 wherein said coating means is a high lubricity material.

51. A compliant foil as in claim 49 wherein said coating means is a stratified fluorocarbon.

52. In combination:

a pair of members arranged for relative rotation with respect to one another, one of said pair of members being adapted to rotatively support the other; and a plurality of compliant overlapping bearing foils operably disposed between said pair of relatively rotatable members, each of said plurality of foils comprising means mounting said foil on one of said pair of relatively rotatable members, a stiffener portion extending from said mounting means in one direction between said pair of members, and a foil portion extending from said mounting means in an opposite direction between said pair of members and overlapping the stiffener portion of an adjacent foil.

53. A hydrodynamic fluid bearing comprising:

a tubular bushing having an inner surface;

a plurality of slots in said surface;

a rotatable member positioned supportively within said bushing;

a plurality of compliant foils operably disposed between said bushing and said member, each foil having an under foil portion, an over foil portion and mounting means intermediate said over foil and under foil portions for positioning in one of said slots, each of said foils being positioned with a free end of said over foil portion contacting an adjacent under foil portion.

54. A hydrodynamic fluid bearing as in claim 53 including friction controlling coating means on an upper surface of each over foil portion and on the inner surface of said bushing.

55. A hydrodynamic fluid bearing as in claim 54 including means in each of said slots for controlling the frictional engagement of said mounting means in said slot.

56. A hydrodynamic fluid bearing as in claim 53 including foil stiffening means for increasing the effective stiffness of each of said foils.

57. A hydrodynamic fluid bearing as in claim 56 wherein said under foil portion is said foil stiffening means.

58. A hydrodynamic fluid bearing as in claim 53 including foil stiffening means for increasing the effective stiffness of each of said foils, said foil stiffening means being positioned beneath said under foil portion and including stiffener mounting means for insertion into said slot.

59. A hydrodynamic fluid bearing as in claim 56 wherein said bearing is cylindrical.

60. A hydrodynamic fluid bearing as in claim 56 wherein said bearing is conical.

* * * * *